United States Patent [19]

Liljegren et al.

[11] Patent Number: 4,978,216

[45] Date of Patent: Dec. 18, 1990

[54] FIGURE WITH BACK PROJECTED IMAGE USING FIBER OPTICS

[75] Inventors: Gordon E. Liljegren, Burbank; Eugene L. Foster, Monterey Park, both of Calif.

[73] Assignee: Walt Disney Company, Glendale, Calif.

[21] Appl. No.: 429,180

[22] Filed: Oct. 30, 1989

[51] Int. Cl.[5] .............................................. G03B 21/26

[52] U.S. Cl. .......................................... 353/28; 353/74

[58] Field of Search ........................ 353/28, 44, 74–78, 353/121, 122; 350/96.15, 96.18, 96.24, 96.26, 120, 117, 118; 352/86–89; 446/297–302

[56] References Cited

U.S. PATENT DOCUMENTS

| | | | |
|---|---|---|---|
| 1,653,180 | 12/1927 | Valbert | 353/28 |
| 2,158,906 | 5/1939 | Netter | 353/29 X |
| 3,016,785 | 1/1962 | Kapany . | |
| 3,053,144 | 9/1962 | Harries et al. | 353/70 X |
| 3,680,948 | 8/1972 | Sussman et al. . | |
| 3,836,911 | 9/1974 | Gibson et al. . | |
| 4,076,978 | 2/1978 | Brennan et al. . | |
| 4,104,625 | 8/1978 | Bristow | 353/87 X |
| 4,139,261 | 2/1979 | Hilsum . | |
| 4,417,412 | 11/1983 | Sansom . | |

FOREIGN PATENT DOCUMENTS

| | | | |
|---|---|---|---|
| 634822 | 1/1962 | Canada . | |
| 56-80039 | 1/1981 | Japan . | |
| 0011446 | 4/1981 | Japan | 353/122 |

*Primary Examiner*—Harry N. Haroian
*Attorney, Agent, or Firm*—Pretty, Schroeder, Brueggemann & Clark

[57] ABSTRACT

A figure is disclosed having a head with a back projected image to animate the facial expression of the figure. The image is back projected onto the head's face by a wide angle lens inside the head having an extremely short focal length. The lens is adjustable for focusing and image registration purposes in vertical, horizontal and lateral directions with respect to the face by a lens adjustment system also inside the head. The image is brought inside the head to the lens by a coherent fiber optic bundle having a high resolution which transfers the image from a remote image source, such as a motion picture projector. Independent movement of the head in all directions with respect to other parts of the figure is provided by a motion device. The lens adjustment system and fiber optic bundle ensure that the image always remains in proper focus and registration on the face despite free and unrestricted movement of the head by the motion device.

40 Claims, 4 Drawing Sheets

FIGURE WITH BACK PROJECTED IMAGE USING FIBER OPTICS

FIELD OF THE INVENTION

This invention relates to figures having a visual image projected upon them to simulate the features of human or non-human characters and, more particularly, to a movable figure having a visual image projected upon it using a flexible fiber optic bundle.

BACKGROUND OF THE INVENTION

Figures in amusement and theme parks have been used for decades to entertain guests in a variety of ways. In the past, typical figures have comprised a human head with a film image projected on the face to animate its expression. The film image can be supplied by a motion picture film, a video tape, a still photograph or similar means.

Two basic techniques have been used to project the film image onto the face. One technique, known as the front projection technique, involves projecting the film image directly onto the front of the figure's face from a concealed source in front of the face. The physical contour of the face is designed to have subtle facial features and is coated with a projection screen material that will properly reflect the image provided by, for example, a motion picture projector. If the facial features of the figure are too sharp or distinct, they may detract from or interfere with the facial image projected by the film. By using proper lighting and sound effects, a wig and clothing, and other special effects, a "talking head" with a lifelike appearance can be created. One popular example of a figure using the front projection technique is the Madam Leota figure in the Haunted Mansion attraction at the Disneyland theme park in Anaheim, Calif.

The second technique, known as the back projection technique, involves projecting the film image, usually by one or more reflectors, onto the back of the figure's face from a remote film source. Generally, the same type of head configuration used in the front projection technique also may be used in the back projection technique. The remote film source used in the back projection technique may be located inside the figure, behind the face, or at another location, depending upon the type of reflective apparatus employed. One example of the back projection technique is disclosed in U.S. Pat. No. 1,653,180 and comprises a projection device located in the back spinal region outside of the figure and two reflective mirrors inside the figure. The first reflective mirror is positioned inside the torso of the figure in front of the projection device at a 45 degree angle to project the film image upwardly to the second reflective mirror. The second reflective mirror, also oriented at a 45 degree angle in a plane parallel to the first mirror, is located in the figure's head and projects the film image onto the back of the face.

Difficulties have been encountered in the past in attempting to construct figures of the type described above that can move and thereby provide a more realistic, lifelike appearance. Figures utilizing the front projection technique are especially prone to problems, because any movement of the figure with respect to the film projection source will cause the projected image to be out of focus and registration. One proposed solution has been to connect the film picture projector to a rotatable base that also carries the figure, so that the projector always moves with the figure. This proposed solution, although it keeps the image focused and registered on the face, is impractical. One drawback is that large amounts of space can be required to accommodate the swinging arc of the rotatable base. Moreover, the figure can only move in one plane of motion, and it does not produce realistic, lifelike movements. The front projection technique suffers from the further handicap that no props or other objects forming a part of the attraction can be placed between the concealed film source and the figure, because there must be a clear path between the film source and the figure. Any prop or object that blocks the path of the film image will prevent the film image from reaching the figure. Also, any fog, smoke or other particles in the air will make the beam visible. For example, while fog and smoke could enhance the visual effect of the figure, they generally may not be used. Similarly, props such as hair, glasses or clothing will obstruct the path of the film image and cast unwanted shadows.

Figures employing the back projection technique suffer from some of the same problems. Since the remote film source usually is connected to or inside the figure itself, any movement of the figure also requires corresponding movement of the film source. Reflective mirrors also are involved, which can cause further limitations on the range of movement of the figure. These limitations on the range of figure movement are especially restrictive when dealing with head movement with respect to the body of the figure. Since the normal human head is capable of pivoting in all directions relative to the rest of the body, neither the front or the back projection techniques currently are capable of projecting a film image onto the face and keeping it focused and registered in the proper position while the head pivots about the body. Any pivoting of the head using these known techniques causes the image to be unfocused, and to lose registration Hence, the freedom of movement of the figure is restricted, and the range of physical expression and realism conveyed by the figure is correspondingly limited.

Yet another disadvantage of the current front and back projection techniques is that they place an undesirable limitation on position of the figure in the attraction In some situations, it may be preferable to situate the figure in a difficult-to-access area to create a desired effect. In such situations, it may be difficult and in some cases impossible using the current projection techniques to project the image onto the figure, even if the figure were to remain stationary. If it was possible to project the image, complicated relay optics likely would be involved. Moreover, movement of the figure's head still would be restricted by the limitations noted above.

Accordingly, there has existed a definite need for a figure having a film projected image that stays in a proper focus and registration on the figure's face as the head pivots in all directions relative to the body. There further has existed a need for a figure that can be placed in any location in the attraction without undue concern for projecting the image onto the figure's face in a simple and effective manner. Moreover, there has long existed a general need for a human-like figure having a film projected facial image that is more realistic and lifelike than those currently in use. The present invention satisfies these needs and provides further related advantages.

SUMMARY OF THE INVENTION

The present invention provides a figure having a unique back projection technique that employs a flexible fiber optic bundle to optically convey a visual image inside the figure from a remote image source to animate the expression of the figure. The figure also includes a device for pivoting the figure in different directions to thereby provide a more realistic, lifelike appearance. By using the flexible fiber optic bundle and an adjustable lens system inside the figure, the visual image always remains in proper focus and registration on the figure allowing independent movements of the figure and face in different directions. The figure of this invention furthermore is intended to be relatively simple in construction, trouble-free and reliable in use, and attains its improved result without requiring reflective devices or the like.

The figure in the preferred embodiment comprises a translucent head having a face coated with a rear projection screen material on its outer surface. A low gain matte neutral gray coating is selected to preserve the desired color and to minimize reflections and hot spotting. A lens mounted inside the head is adapted to project an image onto the projection screen material to animate the facial expressions of the figure. The lens has an extremely short focal length (4 mm). This is important to produce the necessary visual image onto the entire face, which is only a short distance away from the lens. The image is conveyed to the lens by a bundle of flexible fiber optic strands coherently arranged to form a fiber optic bundle adapted to optically convey images from the image source to the lens. In the preferred embodiment, the fiber optic bundle is encased in a flexible sheath and extends from the image source to the lens through an opening in the lower back portion of the head out of view from the front. Since the bundle of fiber optic strands is flexible and coherently arranged, the head can move and twist in different directions, for example, nodding or side-to-side movement, while the image source outside of the figure remains stationary, without causing the image to lose registration and to become unfocused on the face.

The figure also is provided with a lens adjustment system designed to optically adjust the lens with respect to the head for proper sizing, registration and focusing of the image onto the face. In the detailed description which follows, two lens adjustment systems are described. Each of these lens adjustment systems includes lateral adjustment means for providing lateral side to side optical registration adjustment of the lens with respect to the head, horizontal adjustment means for providing horizontal front to back image size adjustment of the lens, and vertical adjustment means for providing vertical up and down registration adjustment of the lens. The lens adjustment system is integral with a hollow sleeve which receives a post from a motion device adapted to support the head and pivot it in different directions. The fiber optic bundle is held within a housing of the lens adjustment system in a vertical direction and then is formed at a 90 degree angle to project forwardly toward the face of the figure. The output end of the fiber optic bundle directed toward the face is connected to a lens adapter which spaces the output end of the bundle a predetermined distance from and in optical alignment with the image receiving portion of the lens. By making various vertical, horizontal and lateral adjustments of the lens with respect to the head, the image can be properly focused and registered on the face and maintained in proper focus and registration despite movement of the head in different directions, since the lens is always connected to the head for movement with it.

The input end of the fiber optic bundle outside the head is connected in optical alignment to a transfer lens which spaces the input end of the bundle a predetermined distance from the transfer lens. This transfer lens, in turn, is positioned in optical alignment with an image source which projects an image onto the input end of the bundle through the transfer lens. The image source may be a motion picture projection device, a video projection device, a laser projection device, or other suitable device capable of creating and projecting a visual image. This image is transferred by the fiber optic bundle to the lens inside the head where it is projected onto the face.

The combination of features comprising the present invention provides a significant improvement in the technique of back projection of images onto figures. The figure of the present invention can simulate realistic, lifelike movement and expression because it is capable of moving like a natural human head. Since the fiber optic bundle is coherent and flexible, the image source and the head can move relative to each other. The image always is kept in proper focus and registration on the face by the unique lens adjustment systems concealed entirely within the head. Moreover, the right angle forming of the bundle inside the head allows the bundle to enter the head in the neck region, just like a human spine, where it is hidden from view. Thus, a wig, clothing or other appropriate costume material will conceal the lens system and the fiber optic bundle which may extend out of the figure at any desired location.

Another feature of the present invention is that there are virtually no limitations on the position of the figure in the attraction or other selected environment The flexible fiber optic bundle makes it possible to situate the figure in a difficult-to-access area to create a desired effect without complicated relay optics or the like. Even in tight areas, the image can be projected onto the figure without restricting movement of the figure's head. Thus, the figure can be placed in virtually any location in an attraction or other environment without undue concern for projecting the image onto the figure's face. In this regard, it will be appreciated that the present invention is not limited to heads but, rather, may be employed on different areas and types of figures. For example, projecting the down to the stomach is one of many available possibilities.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the figure and image projection system of the invention. In such drawings.

DETAILED DESCRIPTION OF THE PREFERRED EMBODIMENTS

Figure 1:
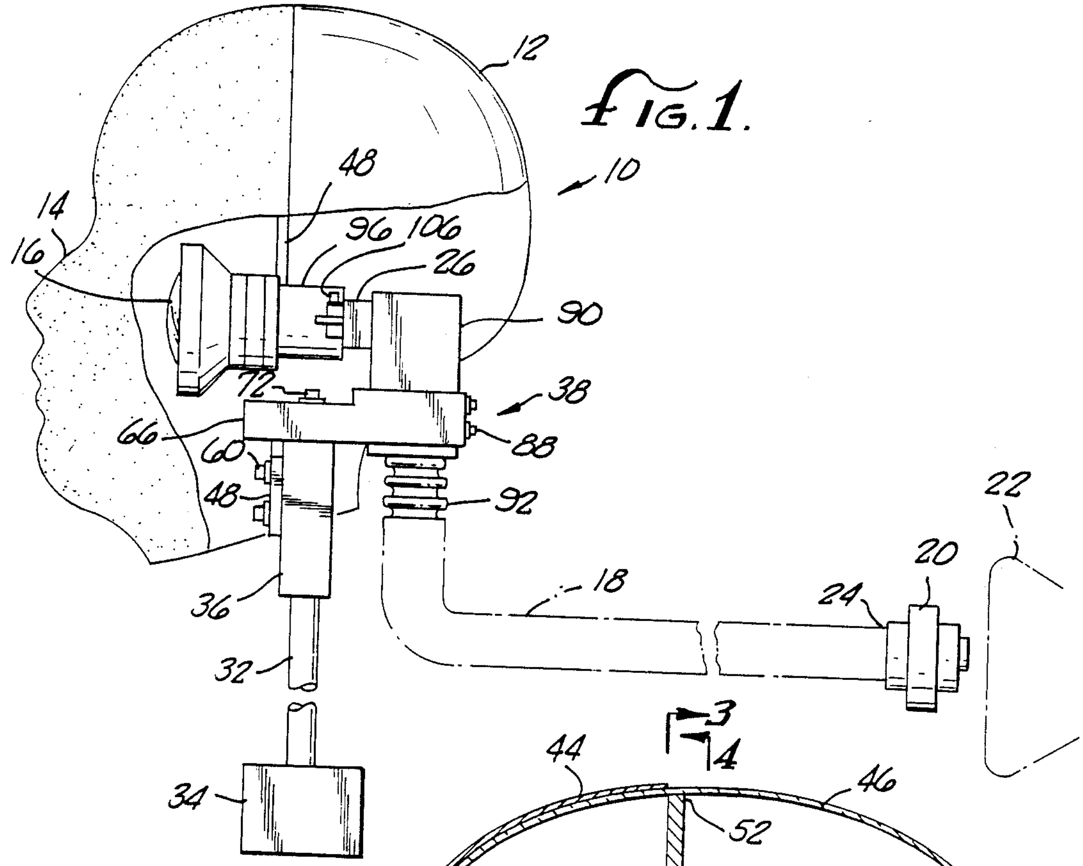
FIG. 1 is a schematic view showing a figure embodying the components of the image projection system of the present invention.

As shown in the exemplary drawings, the present invention is embodied in a figure, generally referred to by the reference numeral 10, of the type that may be used in an amusement or theme park or other selected environment to entertain and amuse the public. Referring to FIG. 1 of the drawings, the figure comprises a head 12 having a face 14 with features resembling those of a human. The physical contour of the face 14 is designed to have subtle, smoothed-out features, since facial features that are too sharp or distinct may detract from or interfere with the facial image to be projected upon the face. However, the features must be distinct enough to look realistic from a side view.

Figure 10:
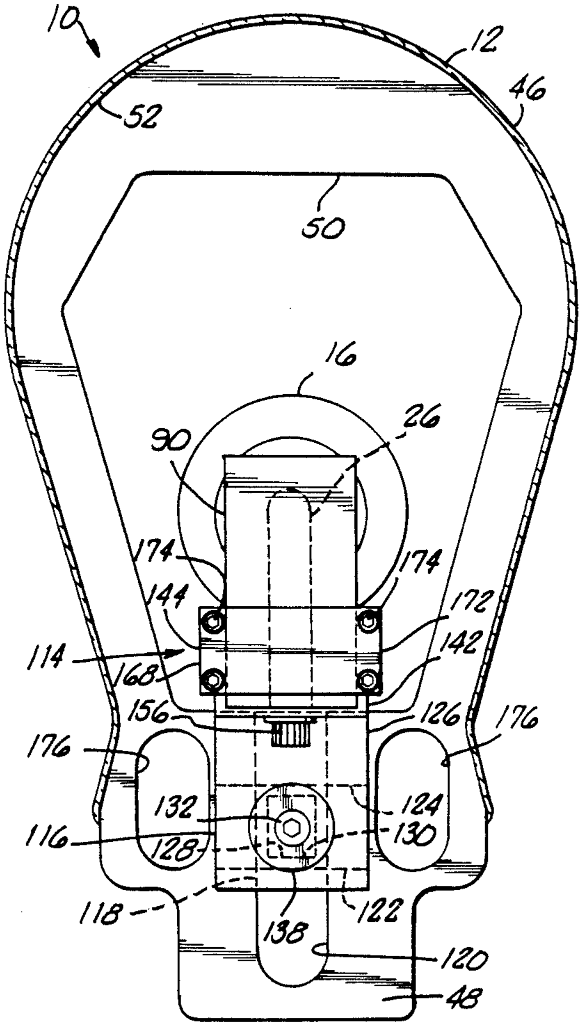
FIG. 10 is a cross-sectional rear view of the figure, taken substantially along line 10—10 of FIG. 8.

Although a FIG. 10 in the form of a human head 12 has been illustrated, it is understood that the features of the present invention are applicable to different types of figures as well. For example, the figure could represent an animal, cartoon character or fictional character. Different parts of the body besides the head also may be shown. By way of example, the chest area of the figure could be exposed to animate the lungs and esophagus and show liquids flowing down into the stomach. Other endless variations are possible.

FIG. 1 includes a unique image projection system comprising a lens 16 mounted inside the head 12 that is adapted to project an image onto the face 14 to animate the facial expressions of the figure. The image is conveyed to the lens 16 by a bundle of flexible fiber optic strands coherently arranged to form a fiber optic bundle 18. This bundle 18 is optically connected to a transfer lens 20 which receives a visual image produced by an image source 22 and projects it onto the input end 24 of the fiber optic bundle. The bundle 18 then transfers the image from the output end 26 of the bundle to the lens 16 where it is projected onto the back 28 of the face 14. The orientation of the projected image as seen from the front 30 of the face 14 is the same as if the image was projected onto a conventional movie projector screen.

More specifically, the head 12 is supported by a cylindrical post 32 connected to a motion device 34 adapted to move the head 12 in different directions in a controlled fashion. Since the normal human head is capable of pivoting in all directions relative to the rest of the body, the motion device 34 likewise is adapted to pivot the post 32 and thus the head 12 in all directions. This movement of the head 12 may be controlled by a computer program in conjunction with various pneumatic or hydraulic systems (not shown) presently in use today on figures in major theme parks, such as Disneyland in Anaheim, Calif. and Disneyworld in Orlando, Fla. If the head 12 forms part of a larger figure or body (also not shown), the motion device 34 can be concealed inside the neck or chest area of the body. Alternatively, the motion device 34 can be connected to some other structure if only the head 12 is displayed. The post 32 is received within a hollow sleeve 36 and, as discussed in more detail below, this sleeve forms the foundation of a lens adjustment system that focuses the image onto the face 14 so that the image always remains in proper focus and registration during movement of the head 12 relative to the image source 22.

Figure 2:
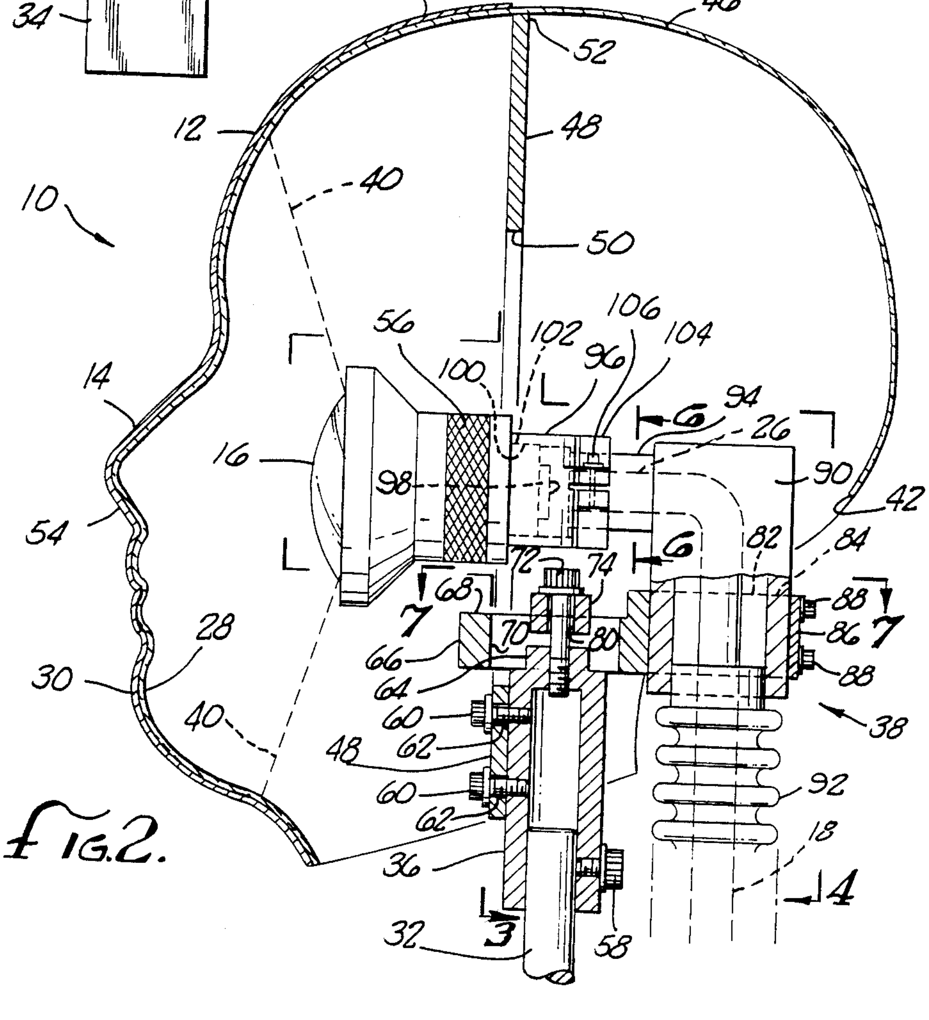
FIG. 2 is a cross-sectional elevational view of the figure, shown in the form of a head, illustrating a lens and a first lens adjustment apparatus for projecting an image onto the head's face in proper focus and registration in con]unction with a fiber optic bundle.

Referring now to FIG. 2, a first lens adjustment system 38 is illustrated in greater detail. The lens 16 in the preferred embodiment is a wide angle television "fish-eye" lens having a very short focal length, for example, 4 mm. In a prototype constructed in accordance with the principles of this invention, a Tokina 4 mm TV lens (F 1.4) of Japan has been tested and found to be satisfactory. Other lenses may be used so long as the projection angle of the lens, indicated by the dotted lines 40 in FIG. 2, is wide enough to substantially cover the figure's face 14. In general, the focal length of the lens 16 depends upon the size of the head 12, the available distance between the lens 16 and the face 14, and the amount of surface area to be covered by the projected image. In addition to these considerations, there is a general necessity for a lens 16 that effectively provides a film image on the face 14 with the least amount of distortion. When dealing with limited space, for example inside a head, the utilization of an extremely short focal length lens therefore is important.

Figure 3:
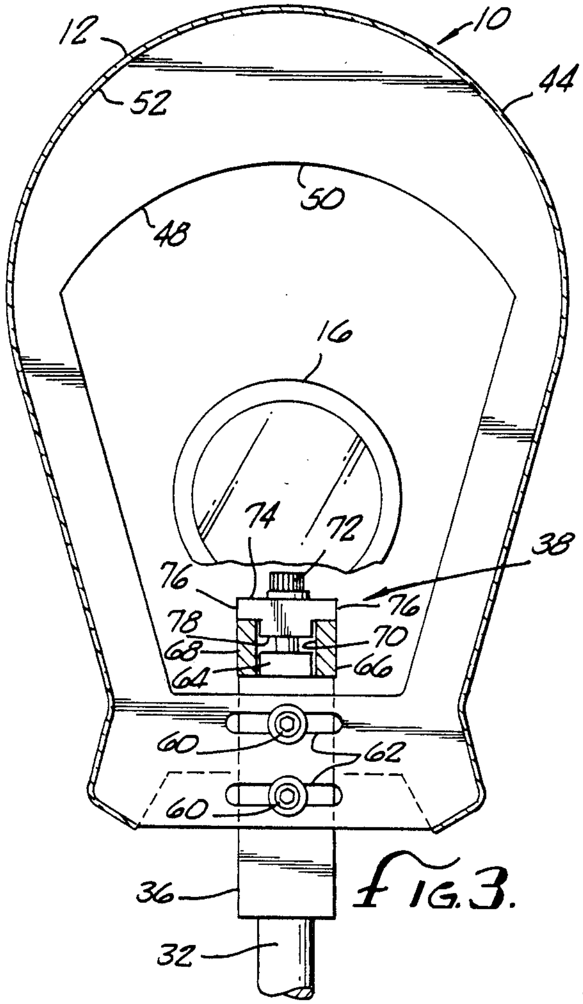
FIG. 3 is a cross-sectional front view of the figure, taken substantially along line 3—3 of FIG. 2.
Figure 4:
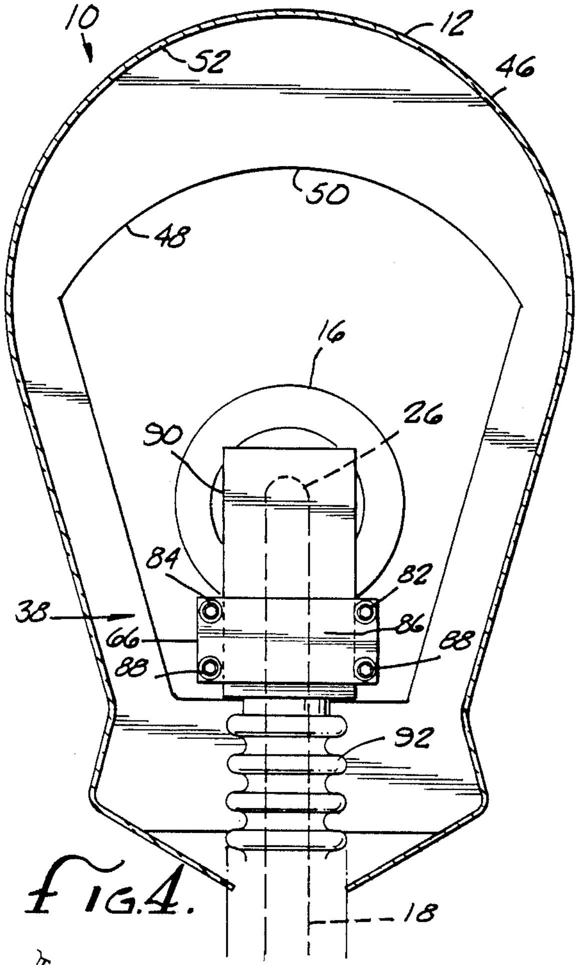
FIG. 4 is a cross-sectional rear view of the figure, taken substantially along line 4—4 of FIG. 2.

The head 12 in the preferred embodiment is hollow and has a continuous opening 42 at the back and lower portion of the head for receiving the first lens adjustment system 38 and the fiber optic bundle 18. This opening 42 generally must be large enough to allow the operator to reach a hand or at least a few fingers inside the head 12 to make focusing adjustments and other adjustments as may be necessary. The head 12 is molded in two halves comprising a front portion 44 and a back portion 46 separated by a mounting plate 48. This mounting plate 48, as with the other components comprising the first lens adjustment system 38 described below, preferably is constructed of aluminum or another suitable rigid, lightweight material. As shown in FIGS. 3 and 4, the mounting plate 48 has a central opening 50 through which the lens 16 and its related support and adjustment structure may project. The periphery 52 of the mounting plate 48 is connected to the head 12 by epoxy or other suitable adhesive or fastening means. The head 12 may be constructed from translucent moldable materials, such as plastic.

The front 30 of the face 14 is coated with a rear projection screen material 54 to permit visualization of the image projected by the lens 16. A low gain matte neutral gray coating 54 has been tested and used satisfactorily in a prototype figure using white light. It also is contemplated that other types of materials may be used.

For example, ultraviolet light may be used with a fluorescent material on the face 14. In general, whatever material is used, it must be able to project the image yet block the components inside the head 12 from view. It also must not add color to the image.

A knurled surface 56 is provided on the lens 16 for adjusting the f-stop of the lens. Normally this is set at the wide open position for maximum image brightness. Further adjustment and focusing of the lens 16 is accomplished by making lateral, horizontal and vertical adjustments of the lens 16 with respect to the face 14. The lateral and vertical adjustments of the lens 16 (via adjustment bolt 60 and screws 88 shown in FIG. 2 and described below) enable proper registration of the image on the face 14, while the horizontal adjustment of the lens (via adjustment bolt 72 also described below) enables proper sizing of the image on the face. Further adjustment means (via screw 106 also discussed below) allow proper focusing of the image onto the face. These adjustments, and the structural components of the first lens adjustment system 38 that provides them, will now be described.

As noted above, the foundational support for the lens 16 stems from the hollow sleeve 36 connected to the post 32 of the motion device 34. The depth of insertion of the post 32 into the sleeve 36 may be controlled as desired by a post adjustment screw 58 threadably received within the sleeve for clamping engagement against the post. The hollow sleeve 36 is connected to the head 12 by two lateral adjustment bolts 60 which pass through elongated slots 62 in the mounting plate 48, as best shown in FIGS. 2 and 3. By loosening the lateral adjustment bolts 60, which are threadably received within the sleeve 36, lateral side to side movement of the sleeve 36 and thus the lens 16 may be accomplished. When the lens 16 is properly centered laterally with respect to the face 14, the lateral adjustment bolts 60 can be tightened to fix the lateral registration of the image on the face 14. This also firmly bolts the sleeve 36 to the mounting plate 48 of the head 12, so that further focusing and registration adjustments of the lens 16 can be carried out independently.

Figure 7:
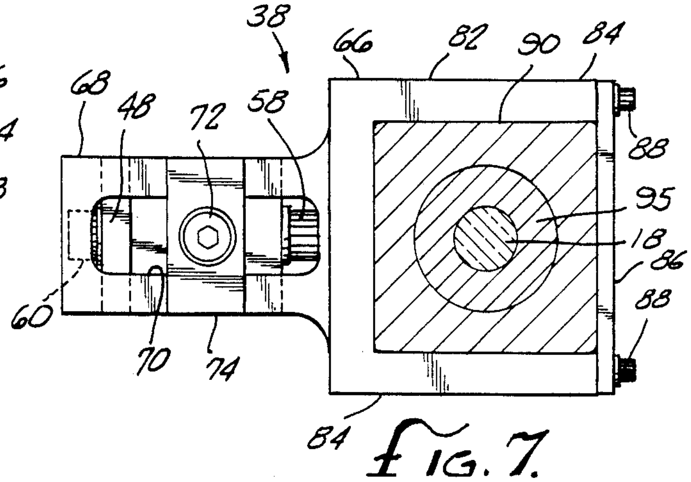
FIG. 7 is a cross-sectional top view of the figure, taken substantially along line 7—7 of FIG. 2.

The hollow sleeve 36 has a horizontal alignment stub 64 on its upper surface adapted for horizontal sliding reception with a slotted mounting bracket 66 which holds the fiber optic bundle 18. As shown in FIGS. 2–3 and 7, the mounting bracket 66 comprises a neck 68 with an elongated slot 70 which fits over the horizontal alignment stub 64 on the sleeve 36. The stub 64, which has a rectangular horizontal cross-section, projects upwardly about one-third of the way into the slot 70 and has dimensions that closely match the width of the slot to prevent wobble between the two parts. The mounting bracket 66 is slidably secured to the hollow sleeve 36 by a horizontal adjustment bolt 72 and a bridge plate 74. The bridge plate 74 has two ledges 76 on opposite sides which fit over the upper portion of the neck 68 and a central body portion 78 of the same dimensions as the horizontal alignment stub 64 which extends downwardly into the slot 70. The horizontal adjustment bolt 72 slidably fits through a central hole 80 in the bridge plate 74 and in threaded reception with the horizontal alignment stub 64 and sleeve 36. By loosening the horizontal adjustment bolt 72, horizontal front to back movement of the mounting bracket 66 and thus the lens 16 may be accomplished. When the lens 16 is positioned at the desired horizontal distance with respect to the face 14, the horizontal adjustment bolt 72 can be tightened to fix the horizontal position of the lens. This horizontal adjustment capability advantageously permits enlargement or reduction of the projected image necessary for proper sizing of the image on the face 14. With the lens 16 projecting the image at infinity focus, the distance between the lens 16 and the face 14 can be varied without repositioning of the lens, because of the extremely short focal length (4 mm) of the lens.

The mounting bracket 66 also includes a yoke 82 integral with the neck 68 extending toward the back portion 46 of the head 12. As shown best in FIG. 7, the yoke 82 has two legs 84 forming an open end and a back plate 86 connected over the open end by four vertical adjustment screws 88, as also shown in FIGS. 2 and 4. The space defined by the legs 84 and open end of the yoke 82 is substantially rectangular in horizontal cross-section and is adapted to slidably receive a rectangular housing 90 containing the fiber optic bundle 18. The bundle 18, which is surrounded by a flexible protective sheath 92, enters the bottom of the housing 90 in a vertical direction. The flexible sheath 92 protects the fiber optic bundle 18 from physical damage and limits its bending radius so that the glass strands or fibers comprising the bundle do not break. The sheath 92 also facilitates handling of the bundle 18. Inside the housing 90, the bundle 18 is curved at approximately a 90 degree angle where it extends forwardly in a horizontal direction into a cylindrical quill 94 that projects forwardly toward the lens 16. To solidly retain the fiber optic bundle 18 in its proper 90 degree angle position, as shown in FIG. 2, the bundle is surrounded by epoxy or other suitable material 95 inside the housing 90.

The housing 90 is clamped within the yoke 82 by the back plate 86. By loosening the vertical adjustment screws 88, which pass through the back plate 86 for threaded reception within the legs 84 forming the yoke 82, vertical up and down movement of the housing 90 and thus the lens 16 may be accomplished. When the lens 16 is properly adjusted vertically with respect to the face 14, the vertical adjustment screws 88 can be tightened to clamp the back plate 86 against the housing 90 and within the yoke 82 to fix the vertical registration of the lens 16 relative to the face 14.

Figure 6:
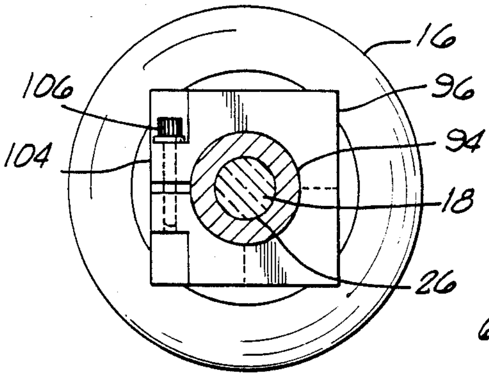
FIG. 6 is a cross-sectional rear view of the figure, taken substantially along line 6—6 of FIG. 2.

The output end 26 of the fiber optic bundle 18 contained inside the quill 94 of the housing 90 is connected to a lens adapter 96 which spaces the end 26 of the bundle 18 a predetermined distance from and in optical alignment with an image receiving portion 98 of the lens 16 providing focus. In the preferred embodiment, the lens adapter 96 is threadably connected to the lens 16 by a pair of internal threads 100 on the lens adapter 96 and external threads 102 on the lens 16. As shown best in FIG. 6, the lens adapter 96 is adjustably connected to the quill 94 and thus the output end 26 of the fiber optic bundle 18 by a C-shaped split ring clamp 104 on the adapter which is tightened and loosened by a clamp screw 106. This arrangement enables fine focusing adjustments by controlling the distance between the output end 26 of the fiber optic bundle 18 and the image receiving portion 98 of the lens 16. It is noted that the task of the lens 16 inside the head 12 is to take the image from the output end 26 of the fiber optic bundle 18 and project this image, in focus, on the back 28 of the face 14. The lens 16 must accept the image exiting the bundle 18, typically in the form of a cone of light, and focus it on the relatively deep, curved back surface 28 of the face 14. Due to the physical constraints of the face 14 and head 12, and the relatively small exit image at the bundle 18, a very short focal length of the lens 16 is needed, as noted above.

Figure 5:
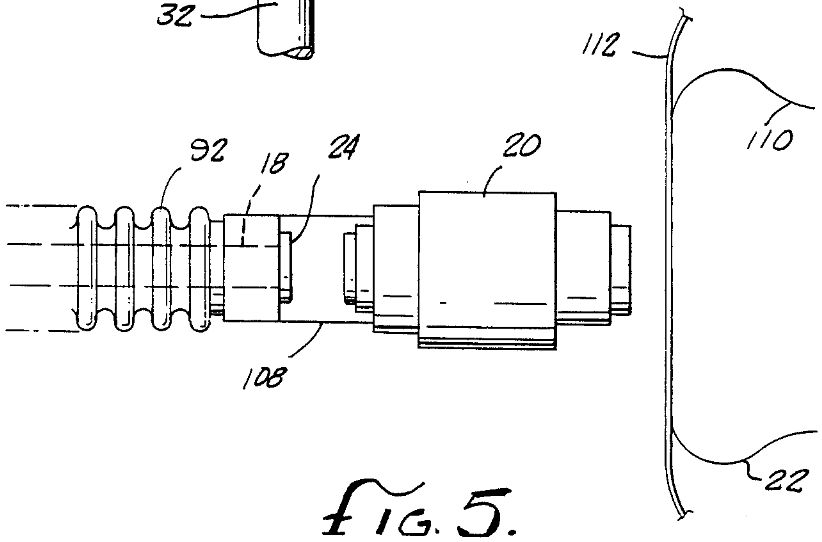
FIG. 5 is a schematic view of a transfer lens in optical alignment between an image source and the fiber optic bundle which conveys the image from the image source to the lens inside the head.

Referring now to FIG. 5, the input end 24 of the fiber optic bundle 18 outside the head 12 is connected in spaced, optical alignment to the transfer lens 20. In the preferred embodiment, a 1:1 transfer lens is used. The purpose of the transfer lens 20 is to enable reduction or enlargement of the film image and to focus it upon the input end 24 of the bundle 18. This allows one to adjust the size of the facial image projected onto the face 14 by appropriate adjustment of the transfer lens 20 with respect to the input end 24 of the bundle 18. Adjustments using the clamp 104 of the lens adapter 96 can change the distance between the output end 26 of the fiber optic bundle 18 and the lens 16 to accomplish the same thing, as noted above. However, a remote adjustment at the transfer lens 20 away from the head 12 is more convenient and advantageous, as the adjustment can be made without working inside the head 12 which may be covered with a wig and clothing, for example.

The transfer lens 20 preferably has a high resolution capability, with the focal length being relatively immaterial. An adjustment sleeve 108 is provided to slidably adjust the distance between the transfer lens 20 and the input end 24 of the bundle 18, as shown in FIG. 5. The sleeve 108 preferably is capable of X-Y microadjustments to align and focus the image from the transfer lens 20 onto the input end 24 of the bundle 18. The other end of the transfer lens 20 is positioned in spaced, optical alignment with the image source 22. The image source 22, for example, may comprise a motion picture projection device 110 utilizing conventional reel-to-reel or continuous loop film 112. Alternatively, the image source 22 may be a video projection device or a laser projection device. Other types of image projection devices may be used, so long as they supply sufficient light to the input end of the transfer lens 20. It also is noted that the image may be moving or still, depending on the effect desired to be achieved.

The fiber optic bundle 18 in the preferred embodiment has a rectangular cross-section of approximately 8 mm×10 mm. In general, the cross-sectional dimensions of the bundle 18 must be large enough to cover the projected area of image. The bundle 18 furthermore is constructed to have an extremely high resolution, with each glass strand or fiber forming the bundle 18 having a diameter of about 10 microns. This high resolution is achieved by using a large number of small diameter strands. Each of these strands are grouped and arranged in a coherent manner so that the strands are all registered in the same location from one end 24 of the bundle 18 to the other 26. Thus, rotation of the input end 24 of the bundle 18 with respect to the output end 26 causes the image to rotate at the output end 26 of the bundle. Fiber optic bundles of this type are available from Schott Fiber Optics of Southbridge, Mass.

When the image is focused on the input end 24 of the bundle 18 using the transfer lens 20, the bundle divides the image into thousands of minute parts corresponding to the number of strands in the bundle. The bundle 18 then transmits each part separately within the individual strands and recombines them at the output end 26 of the bundle. The fiber optic bundle 18 therefore is a device that will convey the image from one place to another and which will allow bending and twisting of the bundle without distorting the image. Such bundles 18, however, tend to lose light transmission at a rate of about seven percent per foot. Thus, it is anticipated that the bundle length should not exceed 15 feet and, in any event, should be as short as is practical.

A second lens adjustment system 114, shown in FIGS. 8–11, will now be described. In FIGS. 8–11, the post 32 and related structure has not been illustrated for purposes of clarity in the drawings. Similarly, the fiber optic bundle 18 and protective sheath 92 have not been illustrated in FIG. 10 for the same reason.

Figure 8:
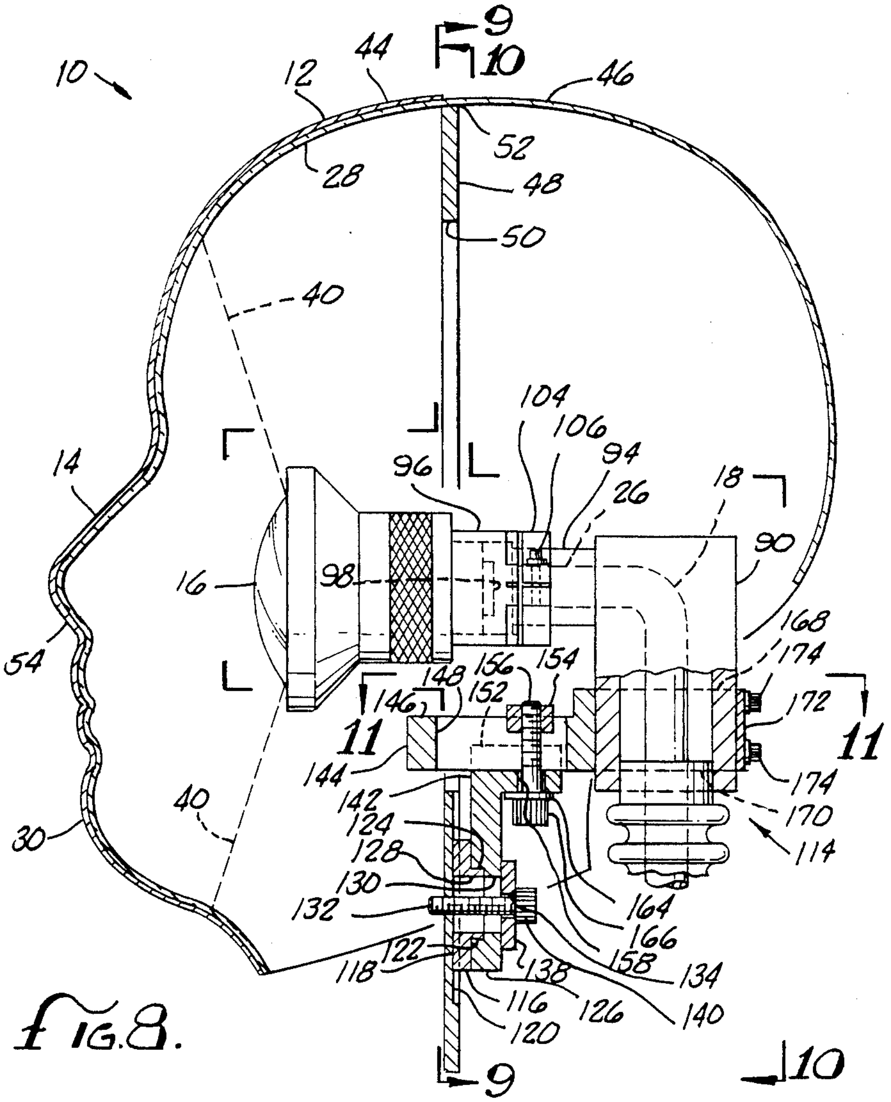
FIG. 8 is a cross-sectional elevational view of the figure, also shown in the form of a head, illustrating a second lens adjustment apparatus for projecting an image onto the head's face in proper focus and registration in conjunction with the fiber optic bundle.

The second lens adjustment system 114 comprises a base plate 116 having a vertical tongue 118 on one side adapted to be received for vertical sliding engagement with a recessed vertical notch 120 in the mounting plate 48. The other side of the base plate 116 has a horizontal tongue 122 adapted for horizontal sliding engagement with a recessed horizontal notch 124 of a leg 126. As shown in FIGS. 8 and 10, both the base plate 116 and the leg 126 have square openings 128 and 130, respectively. These square openings 128 and 130 are horizontally aligned with each other to enable a first adjustment bolt 132 having an enlarged head 134 to pass freely through them for threaded reception in one of three threaded holes 136 in the mounting plate 48. Three threaded holes 136 are provided in the mounting plate 48 to allow a wider range of vertical adjustment of the second lens adjustment system 114. A circular washer 138 having a diameter slightly larger than the dimensions of the square openings 128 and 130 has an unthreaded central hole for receiving the first adjustment bolt 132.

When the first adjustment bolt 132 is tightened down, the enlarged head 134 bears against the circular washer 138 causing the washer to clamp the leg 126 and base plate 116 against the mounting plate 48. This prevents any movement of these components of the second lens adjustment system 114. By loosening the first adjustment bolt 132, vertical up and down movement of the base plate 116 and thus the lens 16 is enabled by sliding movement of the vertical tongue 118 within the vertical recessed notch 120 of the mounting plate 48. At the same time, lateral side to side movement of the leg 126 and thus the lens 16 is enabled by sliding movement of the horizontal tongue 122 within the horizontal recessed notch 124 of the leg 126. The range of vertical and lateral movement of the base plate 116 and leg 126 is limited by the size of their openings 128 and 130 which contact the first adjustment bolt 132 at their outer limits of travel. The first adjustment bolt 132, in cooperation with the openings 128 and 130, also prevents the base plate 116 and leg 126 from becoming totally disassembled when the first adjustment bolt 132 is loosened to make adjustments to the lens 16. Tightening of the first adjustment bolt 132 secures the lens 16 in the desired vertical and lateral orientations. A knurled outer surface 140 is provided on the enlarged head 134 to facilitate tightening and loosening of the bolt 132, either by hand or with the aid of a tool.

Figure 9:
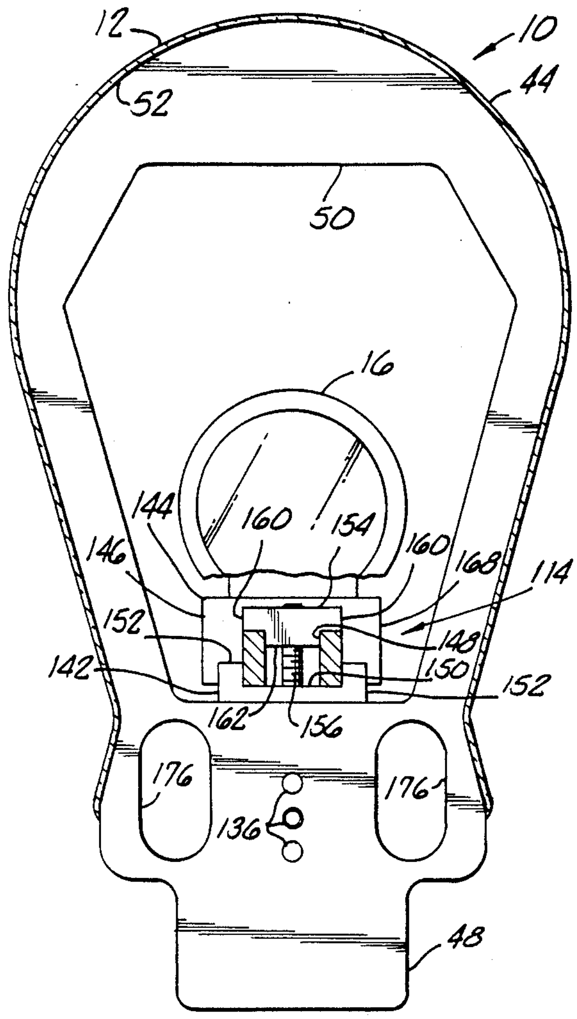
FIG. 9 is a cross-sectional front view of the figure, taken substantially along line 9—9 of FIG. 8.
Figure 11:
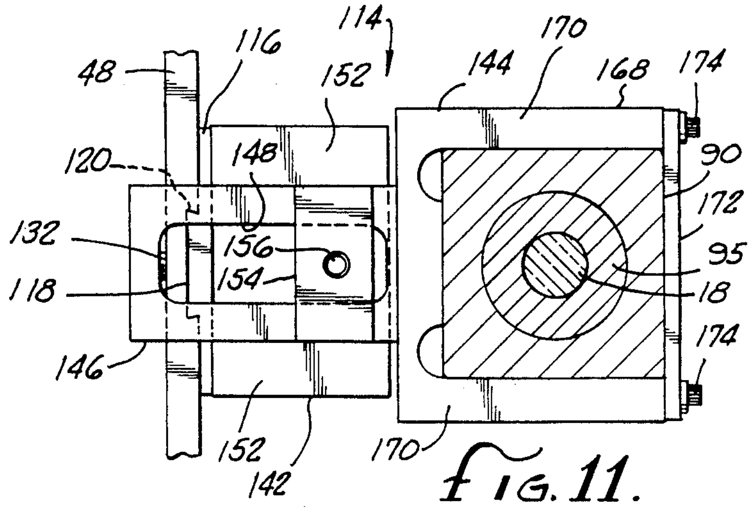
FIG. 11 is a cross-sectional top view of the figure, taken substantially along lines 11—11 of FIG. 8.

The leg 126 has a horizontal foot 142 at its upper end adapted for horizontal sliding reception with a slotted mounting bracket 144 which holds the fiber optic bundle 18, very similar to the mounting bracket 66 discussed above in connection with the first lens adjustment system 38. As shown in FIGS. 8–9 and 11, the mounting bracket 144 comprises a neck 146 with an elongated slot 148. The outer sidewalls of the neck 146 are received within a groove 150 formed by vertical sidewalls 152 extending from the upper surface of the foot 142. The mounting bracket 144 is slidably secured to the foot 142 by a bridge plate 154 and a second adjustment bolt 156 with an enlarged head 158. As shown best in FIG. 9, the bridge plate 154 has two ledges 160 on opposite sides which fit over the upper surface of the neck 146, and a central body portion 162 which extends downwardly into the elongated slot 148 of the neck 146. The second adjustment bolt 156 slidably fits through an unthreaded hole in the foot 142 and in threaded reception with the bridge plate 154.

When the second adjustment bolt 156 is tightened down, the enlarged head 158 bears against a washer 164 to clamp the mounting bracket 144 between the bridge plate 154 and the foot 142. This prevents any movement of these components of the second lens adjustment system 114. By loosening the second adjustment bolt 156, horizontal front to back movement of the mounting bracket 144 and thus the lens 16 may be accomplished by sliding movement of the neck 146 within the groove 150 of the foot 142. When the lens 16 is positioned at the desired horizontal distance with respect to the face 14, the second adjustment bolt 156 can be tightened to fix the horizontal position of the lens. A knurled outer surface 166 is provided on the enlarged head 158 to facilitate tightening and loosening of the bolt 156, either by hand or a tool.

The remainder of the mounting bracket 144 is substantially identical to the mounting bracket 66 of the first lens adjustment system 38. Thus, the mounting bracket of the second lens adjustment 114 system also includes a yoke 168 integral with the neck 146 having two legs 170 forming an open end adapted to slidably receive the rectangular housing 90 containing the fiber optic bundle 18. A back plate 172 is connected over the open end by four screws 174. The bundle 18 also enters the housing 90 in a vertical direction and is curved at approximately a 90 degree angle where it extends forwardly in a horizontal direction toward the lens 16. Similarly, the bundle 18 is surrounded by epoxy or other suitable material 95 inside the housing 90. The output end 26 of the fiber optic bundle 18 is connected to the lens adapter 96 in the same manner as in the first lens adjustment system 38. It also should be noted that openings 176 (shown in FIGS. 9–10) may be provided in the mounting plate 48 to reduce the weight of the FIG. 10.

In comparison to the first lens adjustment system 38, the second lens adjustment system 114 is the preferred system because it enables accurate and reliable lens adjustments in a more simple manner with fewer adjustment steps. For example, by loosening the first adjustment bolt 132, vertical up and down movement and lateral side to side movement of the lens 16 may be achieved at the same time. When the lens 16 is properly centered both vertically and laterally with respect to the face 14 providing the desired registration, only the first adjustment bolt 132 needs to be tightened to fix the lens 16 in the desired position. Horizontal adjustment of the lens 16 is easily accomplished by loosening the second adjustment bolt 156 which changes the size of the image on the face 14. Of course, it will be apparent to those skilled in the art that other types of lens adjustment systems can be constructed to accomplish the same purpose as those described above. However, it is essential that the lens 16 be securely locked rigidly in place once the lens is properly positioned with respect to the face 14. During movement of the FIG. 10, the fiber optic bundle 18 may tug on the head 12 and cause the lens 16 to move if it is not securely fastened. This will cause the image to go out of registration and out of focus on the face 14, which is unacceptable. Therefore, a reliable and secure lens adjustment system is required.

The structural features of the present invention provide a significant advance in the technique of back projection of images onto figures. The use of the fiber optic bundle 18 enables free and unrestricted independent movement of the head 12 with respect to other parts of the figure's body. For example, the head 12 may move while the image source 22 remains stationary. This movement of the head 12 may comprise twisting and turning, nodding and other movements to simulate realistic, lifelike movements and expressions similar to those of a natural human head. All of this occurs without unfocusing or loss of registration of the image.

Moreover, because the bundle 18 is capable of being curved at a 90 degree angle inside the housing 90, and because the lens 16 has an extremely short focal length, all of the components comprising the lens system 38 can fit inside the head 12 where they may be concealed from view by a wig, clothing or other costumes to present the most realistic figure possible. The 90 degree bend on the bundle 18 also allows the bundle to extend vertically downwardly where it can be channeled into the neck area of the head 12, much like a human spine. From there, the bundle 18 can exit the figure 10 from virtually any desired location. Furthermore, by connecting everything inside the head 12, a clear, focused and registered image is projected onto the face 14, despite movement of the head in different directions.

The figure of this invention is especially versatile because it can be costumed or dressed up without concern for obstructing any light beams from an external image source. Thus, the use of fog and smoke may be freely used to enhance the visual effect of the figure. Similarly, props such as hair, glasses or clothing will not obstruct the path of the film image or convey any unwanted shadows. If proper sealing precautions are taken, it is contemplated that the figure could be displayed in the rain, or even submersed in water so that it could pop up and startle an unsuspecting guest. The possibilities are virtually endless due to the unique versatility and life-like simulation of the figure.

The unique lens adjustment systems 38 and 114 also enable very fine focusing adjustments in order to maintain sharp focus of the image on the face 14, as well as to reduce or enlarge the final image. These fine tuning adjustments ensure that a clear image always is kept in proper focus and registration on the face 14. If reel-to-reel film 112 is used in conjunction with the image source 22 to create the projected image, the film could comprise the face of a real person, or of an animated figure, to animate the facial expression of the FIG. 10. It also is contemplated that various video projection devices, laser projection devices and computer graphic devices can be used to create the image.

Another feature of the present invention is that the FIG. 10 may be placed without restriction in virtually any location of the attraction or other selected environment. Since no complicated relay optics or reflected devices are involved, the image can be projected onto the FIG. 10 in tight areas without restricting movement of the figure's head 12. This is all made possible by the relatively compact lens adjustment systems 38 and 114 in combination with the flexible fiber optic bundle 18. Thus, the FIG. 10 can be placed in virtually any location in an attraction or other environment without undue concern for properly registering and focusing the image onto the figure's face 14. In this regard, it will be appreciated that the principles of the present invention are not limited to heads 12 but, rather, may be employed on different types of figures as well.

From the foregoing, it will be appreciated that the FIG. 10 embodying the principles of the present invention can convey the most realistic and lifelike image possible By using the flexible fiber optic bundle 18 and the concealed lens adjustment systems 38, free and unrestricted figure movement is possible in virtually any area while maintaining a clear, focused and registered image.

While a particular form of the invention has been illustrated and described, it will be apparent that various modifications can be made without departing from the spirit and scope of the invention. Accordingly, it is not intended that the invention be limited, except as by the appended claims.

We claim:

1. A figure, comprising:

(a) a body portion having a translucent surface;

(b) an image forming means inside the body portio for forming a visual image on the surface;

(c) an image source outside the body portion for providing an image;

(d) a bundle of flexible fiber optic strands coherently arranged to optically convey the image from the image source to the image forming means; and (e) a section of the bundle inside the body portion adjacent to the image forming means being permanently formed at substantially a 90 degree angle and encased within a housing connected to the body portion.

2. The figure of claim 1, wherein the image forming means comprises:

(a) a lens inside the head in optical alignment with one end of the bundle of fiber optic strands; and (b) a coating of projection screen material on the surface.

3. The figure of claim 2, wherein the lens has a very short focal length.

4. The figure of claim 3, wherein the focal length of the lens is between 3 mm and 6 mm.

5. The figure of claim 3, wherein the focal length of the lens is 4 mm.

6. A figure, comprising:

(a) a head having a translucent face;

(b) a lens mounted inside the head adapted to project an image onto the face;

(c) an image source outside of the head for providing an image;

(d) a plurality of flexible fiber optic strands coherently arranged to form a fiber optic bundle adapted to optically convey the image from the image source to the lens; and (e) a section of the bundle inside the head adjacent to the lens being permanently formed at substantially a 90 degree angle and encased within a housing connected to the head.

7. The figure of claim 6, further comprising pivoting means for pivoting the head in different directions with respect to a body or other part of the figure.

8. The figure of claim 6, further comprising lens adjustment means substantially inside the head for optically adjusting the lens with respect to the head in lateral, horizontal and vertical directions for proper focusing, registration and size of the image onto the face.

9. The figure of claim 8, wherein the lens adjustment means comprises:

(a) lateral adjustment means for providing lateral side to side optical adjustment of the lens with respect to the head;

(b) horizontal adjustment means for providing horizontal front to back optical adjustment of the lens with respect to the head; and (c) vertical adjustment means for providing vertical up and down optical adjustment of the lens with respect to the head.

10. The figure of claim 6 wherein the face is coated with a projection screen material.

11. The figure of claim 6, wherein the image source is a motion picture projection device.

12. The figure of claim 6, wherein the image source is a video projection device.

13. The figure of claim 6, wherein the image source is a laser projection device.

14. The figure of claim 6, wherein the fiber optic bundle is encased in a flexible sheath.

15. The figure of claim 6, wherein the fiber optic bundle is connected at one end to a lens adapter which spaces the end of the lens a predetermined distance from and in optical alignment with the one end of the fiber optic bundle, and wherein the other end of the fiber optic bundle is connected in optical alignment to a transfer lens which spaces the transfer lens a predetermined distance from the other end of the fiber optic bundle.

16. The figure of claim 15, wherein the transfer lens is positioned in optical alignment between the other end of the fiber optic bundle and the image source.

17. The figure of claim 6, wherein the bundle of fiber optic strands is encased in a flexible sheath extending from the image source to the lens through an opening in the bottom of the head.

18. The figure of claim 6, wherein one end of the bundle of fiber optic strands is spaced by a lens adapter a predetermined distance from and in optical alignment with the image receiving portion of the lens.

19. The figure of claim 18, wherein the lens adapter is threadably connected to the lens and adjustably connected to the one end of the bundle of fiber optic strands.

20. The figure of claim 19, wherein the lens adapter is adjustably connected to the bundle of fiber optic strands by a clamp on the adapter that is tightened and loosened by a screw.

21. The figure of claim 18, wherein the bundle of fiber optic strands adjacent to the one end inside the head is formed at substantially a 90 degree angle and is encased inside a housing.

22. The figure of claim 16, wherein vertical up and down adjustment of the lens with respect to the face is provided by a mounting bracket connected inside the head having a yoke with an open end for vertical sliding reception of the housing, and a back plate that fits over the open end of the yoke for securing the housing to the yoke at the desired vertical position.

23. The figure of claim 22, wherein horizontal front to back adjustment of the lens with respect to the face is provided by a sleeve having an alignment stub adapted for horizontal sliding reception of the mounting bracket, and a horizontal adjustment bolt for securing the mounting bracket to the sleeve at the desired horizontal position.

24. The figure of claim 23, wherein the lateral side to side adjustment of the lens with respect to the face is provided by a mounting plate secured to the head having at least one transverse slot adapted to receive a bolt for connecting the sleeve to the mounting plate at the desired lateral position.

25. The figure of claim 24, wherein the sleeve is hollow and has an open end for receiving a post to support the head.

26. The figure of claim 25, wherein the post is connected to a motion device adapted to pivot the head in different directions to simulate lifelike movement of a human head.

27. The figure of claim 6, wherein horizontal front to back adjustment of the lens with respect to the face is provided by:

(a) a mounting bracket secured to the housing;

(b) a leg connected to the head having a means for horizontal sliding reception of the mounting bracket; and (c) means for securing the mounting bracket to the leg at the desired horizontal position.

28. The figure of claim 27, wherein lateral side to side adjustment of the lens with respect to the face is provided by:

(a) a base plate connected to the head having a horizontal tongue on one side adapted for lateral sliding reception within a horizontal recessed notch in the leg; and (b) means for securing the leg to the base plate at the desired lateral position.

29. The figure of claim 28, wherein vertical up and down adjustment of the lens with respect to the face is provided by:

(a) a vertical tongue on the other side of the base plate adapted for vertical sliding reception within a vertical recessed notch in a mounting plate secured to the head; and (b) means for securing the base plate to the mounting plate at the desired vertical position.

30. The figure of claim 6, wherein one end of the bundle of fiber optic strands outside of the head is spaced a predetermined distance from a transfer lens positioned in optical alignment between the image source and the end of the bundle.

31. The figure of claim 1, wherein the image source is a motion picture projection device.

32. The figure of claim 1, wherein the image source is a video projection device.

33. The figure of claim 1 wherein the image source is a laser projection device.

34. The figure of claim 6 wherein the head is a formed butearate head constructed from a translucent material.

35. The figure of claim 34, wherein the translucent material is a plastic material.

36. The figure of claim 6, wherein the face comprises a projection screen including a low gain matte neutral gray material applied to the outside surface of the face.

37. A figure, comprising:

(a) a head having a face forming a projection screen;

(b) a lens mounted inside the head adapted to project an image onto the projection screen to animate the facial expression of the figure;

(c) an image source outside of the head for providing images to be projected by the lens onto the projection screen;

(d) a bundle of flexible fiber optic strands coherently arranged to optically convey images from one end of the bundle to the other;

(e) lateral adjustment means for providing lateral side to side optical adjustment of the lens with respect to the head;

(f) horizontal adjustment means for providing horizontal front to back optical adjustment of the lens with respect to the head; and (g) vertical adjustment means for providing vertical up and down optical adjustment of the lens with respect to the head.

38. A figure, comprising:

(a) a head having a face forming a projection screen;

(b) a lens mounted inside the head adapted to project an image onto the projection screen to animate the facial expression of the figure;

(c) an image source outside of the head for providing images to be projected by the lens onto the projection screen;

(d) a bundle of flexible fiber optic strands coherently arranged to optically convey images from the image source to the lens; and (e) an end of the bundle of fiber optic strands being inside the head and spaced by a lens adapter a predetermined distance from and in optical alignment with the image receiving portion of the lens.

39. A figure, comprising:

(a) a head having a translucent face;

(b) image forming means inside the head for forming a visual image on the face;

(c) an image source outside the head for providing an image;

(d) a bundle of flexible fiber optic strands coherently arranged to optically convey the image from the image source to the image forming means, the bundle being rectangular in cross-section having two long sides and two short sides; and (e) a section of the bundle inside the head adjacent to the image forming means being permanently formed at substantially a 90 degree angle and encased within a housing connected to the head, such that the end of the bundle faces the image forming means with the long sides of the bundle being oriented in a vertical direction.

40. A figure, comprising:

(a) a body portion having a translucent surface;

(b) a lens inside the body portion for forming a visual image on the surface;

(c) an image source outside the body portion for providing an image;

(d) a bundle of flexible fiber optic strands coherently arranged to optically convey the image from the image source to the lens; and (e) lens adjustment means substantially inside the body portion for optically adjusting the lens with respect to the body portion for proper focusing, registration, and sizing of the image onto the surface, including lateral adjustment means for providing lateral side to side optical adjustment of the lens with respect to the body portion, horizontal adjustment means for providing horizontal front to back optical adjustment of the lens with respect to the body portion, and vertical adjustment means for providing vertical up and down optical adjustment of the lens with respect to the body portion.

* * * * *